US011034109B2

(12) United States Patent
Caneva et al.

(10) Patent No.: US 11,034,109 B2
(45) Date of Patent: Jun. 15, 2021

(54) EXTENSIBLE CORRUGATED TUBE AND RESPECTIVE METHOD FOR MANUFACTURING

(71) Applicant: ADEGA S.R.L. UNIPERSONALE, Creazzo (IT)

(72) Inventors: Luigino Caneva, Altavilla Vicentina (IT); Gianmarco Caneva, Altavilla Vicentina (IT)

(73) Assignee: ADEGA S.R.L. UNIPERSONALE, Creazzo (IT)

( * ) Notice: Subject to any disclaimer, the term of this patent is extended or adjusted under 35 U.S.C. 154(b) by 158 days.

(21) Appl. No.: 16/343,035

(22) PCT Filed: Oct. 30, 2017

(86) PCT No.: PCT/IB2017/056724
§ 371 (c)(1),
(2) Date: Apr. 18, 2019

(87) PCT Pub. No.: WO2018/078597
PCT Pub. Date: May 3, 2018

(65) Prior Publication Data

US 2020/0047439 A1 Feb. 13, 2020

(30) Foreign Application Priority Data

Oct. 28, 2016 (WO) .................. PCT/IB2016/056531

(51) Int. Cl.
*F16L 11/11* (2006.01)
*B29D 23/18* (2006.01)
*B29C 63/10* (2006.01)
*B29C 63/24* (2006.01)
*B32B 1/08* (2006.01)
*F16L 11/112* (2006.01)
*F16L 11/115* (2006.01)
*F16L 11/12* (2006.01)

(52) U.S. Cl.
CPC .............. *B29D 23/18* (2013.01); *B29C 63/10* (2013.01); *B29C 63/24* (2013.01); *B32B 1/08* (2013.01); *F16L 11/112* (2013.01); *F16L 11/115* (2013.01); *F16L 11/12* (2013.01)

(58) Field of Classification Search
CPC .......... F16L 11/08; F16L 11/085; F16L 11/06; F16L 11/12; F16L 11/11
USPC ......................... 138/121, 122, 118, 119, 137
See application file for complete search history.

(56) References Cited

U.S. PATENT DOCUMENTS 2,788,804 A * 4/1957 Larkin .................. D04B 1/225 138/125
3,253,618 A * 5/1966 Cook ..................... F16L 57/00 138/125
3,682,202 A * 8/1972 Buhrmann ............... D04B 1/14 138/126

(Continued)

*Primary Examiner* — Patrick F Brinson
(74) *Attorney, Agent, or Firm* — Mark M. Friedman

(57) ABSTRACT

An extensible corrugated hose comprises a first bearing layer (1) in a elastically extensible first polymeric material, a reinforcement (2) wound on said first layer (1), a stabilizing second layer (3) in an elastically extensible second polymeric material covering the reinforcement (2) for defining a corrugated single tubular body (4) with the first layer (1), a coating third layer (5) placed on the second layer (3) for covering the corrugated single tubular body (4).

12 Claims, 4 Drawing Sheets

5 6 10 4 1 3 2 6

(56) References Cited

U.S. PATENT DOCUMENTS

| | | | | | |
|---|---|---|---|---|---|
| 3,779,308 | A * | 12/1973 | Buhrmann | F16L 11/085 165/51 |
| 4,044,799 | A * | 8/1977 | Higbee | B29C 44/322 138/125 |
| 4,679,599 | A * | 7/1987 | Newberry | F16L 11/085 138/104 |
| 5,477,888 | A * | 12/1995 | Mezzalira | D04B 1/225 138/125 |
| 2012/0042980 | A1 * | 2/2012 | Mezzalira | B32B 5/026 138/137 |
| 2013/0092276 | A1 * | 4/2013 | Caneva | D04B 21/205 138/123 |
| 2019/0145553 | A1 * | 5/2019 | Mezzalira | F16L 11/08 138/118 |

* cited by examiner

EXTENSIBLE CORRUGATED TUBE AND RESPECTIVE METHOD FOR MANUFACTURING

TECHNICAL FIELD

The present invention finds application in the field of hose in general and methods for the processing of polymeric materials and it particularly relates with an extensible corrugated hose of reinforced type, adapted to be used in particular for gardening.

The invention also relates to a method for manufacturing the above corrugated hose.

STATE OF THE ART

Several flexible and extensible hoses are known which are suitable for gardening and are characterized by stretching under pressure and then moving from a contracted resting condition in the absence of pressure to a more or less extended working condition, depending on the fluid pressure inside it.

U.S. Pat. Nos. 8,479,776 and 8,291,941 disclose a vulcanized rubber hose inserted in a textile sheath about 2 to 3 longer of the hose in the resting condition. At the passage of the pressurized water the hose dilates and stretches to fill the textile sheath. However, due to successive uses, the sheath tends to not distribute regularly on the hose and hence the rubber hose, in some sections, extends over until it reaches the outbreak. In addition, the sheath becomes dirty and is difficult to clean.

WO2015177664 discloses a hose similar to the above, wherein instead of the textile sheath there is a corrugated sheath similar to that used to protect electrical wires. This hose has difficulty in stretching, tends to rotate under pressure and bursts at a relatively low pressure. Also in this case, the outer sheath collects much dirt.

WO2016128940 discloses a corrugated semirigid hose covered with a very elastic sheath. The corrugated hose extends under pressure while the outer sheath makes the outer hose smooth to facilitate return after discharge. However, the hose has difficulty in stretching, it is less resistant to pressure and if the pressure approaches the burst pressure, the hose becomes damaged and loses its ability to shorten.

WO2016098063 discloses a hose having an inner layer of high thickness that is elongated about 100%, reinforced with a mesh and wound with a textile spiral to be subsequently coated with a thin plastic sheath. At the exit of the line, the hose, due to the tension on the inner layer, shortens to match the original length of the inner layer.

The hose is characterized by a reduced elongation at the standard pressure of 3 bar.

The outer sheath is very thin and tends to easily decay, damaging the reinforcement; furthermore, the outer surface of the hose is not smooth and when the hose shortens also collects dirt. Last but not least, the water flow rate is low as it is limited to keep high the pressure and therefore the elongation of the hose.

Ultimately, the extensible gardening hose according to the known art are limited by ease of breakage, dirt collection, low burst pressure, difficulty in stretching as a result of water at low flow rate resulting in high pressures not suitable for irrigation in terraces and gardens, as it would tend to spread the earth out from the vessel.

SCOPE OF THE INVENTION

The object of the present invention is to overcome the above mentioned drawbacks by providing an extensible corrugated hose which is characterized by high efficiency and relative cost-effectiveness.

A particular object is to provide an extensible corrugated hose having a high burst pressure, preferably at least 25 bar, and relatively high elongation, at least 100% elongation at 3 bar.

Still another object is to provide an extensible corrugated hose having a limited maximum elongation, which can extend up to a predetermined pressure significantly lower than the burst one, for example up to the pressure of 3 bar, to remain almost stable until the burst pressure.

Still another object is to provide an extensible corrugated hose that is free from the accumulation of dirt particles on its outer surface.

Yet another object is to provide an extensible hose having a good water flow rate.

Yet another object is to provide an extensible hose that is relatively thin and light and takes up little space.

Such objects, as well as others that will become more apparent hereinafter, are achieved by an extensible corrugated hose which, according to claim 1, comprises a first bearing layer in an elastically extensible first polymeric material, a reinforcement wound on said first layer, a stabilizing second layer in an elastically extensible second polymeric material covering said reinforcement to define with said first layer a single tubular body.

According to a peculiar feature of the invention, said single tubular body is corrugated and there is also provided a third coating layer arranged on said second layer and covering said corrugated single tubular body.

Thanks to this combination of features, the hose will be smooth oat the outside to avoid dirt collection thereon and it will also be more extensible and with higher burst strength thanks to the elasticity and to the reinforcement of the inner layers.

According to a further aspect of the invention there is provided a method according to claim 6 for manufacturing the corrugated hose.

Advantageous embodiments of the invention are obtained according to the dependent claims.

BRIEF DISCLOSURE OF THE DRAWINGS

Further features and advantages of the invention will become more apparent in the light of the detailed description of a preferred but not exclusive embodiment of a hose and a method according to the invention, illustrated by way of non-limiting example with the aid of the attached drawing tables, wherein:

FIG. 1*a* is a cross sectional view of a hose in a first step of a making-of seguence;

FIG. 1*b* is a front view of a hose in a second step of a making-of seguence according to first variant;

FIG. 1*c* is a front view of a hose in a second step of a making-of seguence according to second variant;

BEST MODES OF CARRYING OUT THE INVENTION

With reference to the accompanying drawings, a preferred but not exclusive configuration of a hose according to the invention is shown, generally designated by 10, which will find a particular but not exclusive application in areas such as gardening and particularly in those limited space conditions such as terraces, balconies and small gardens.

Figure 1:
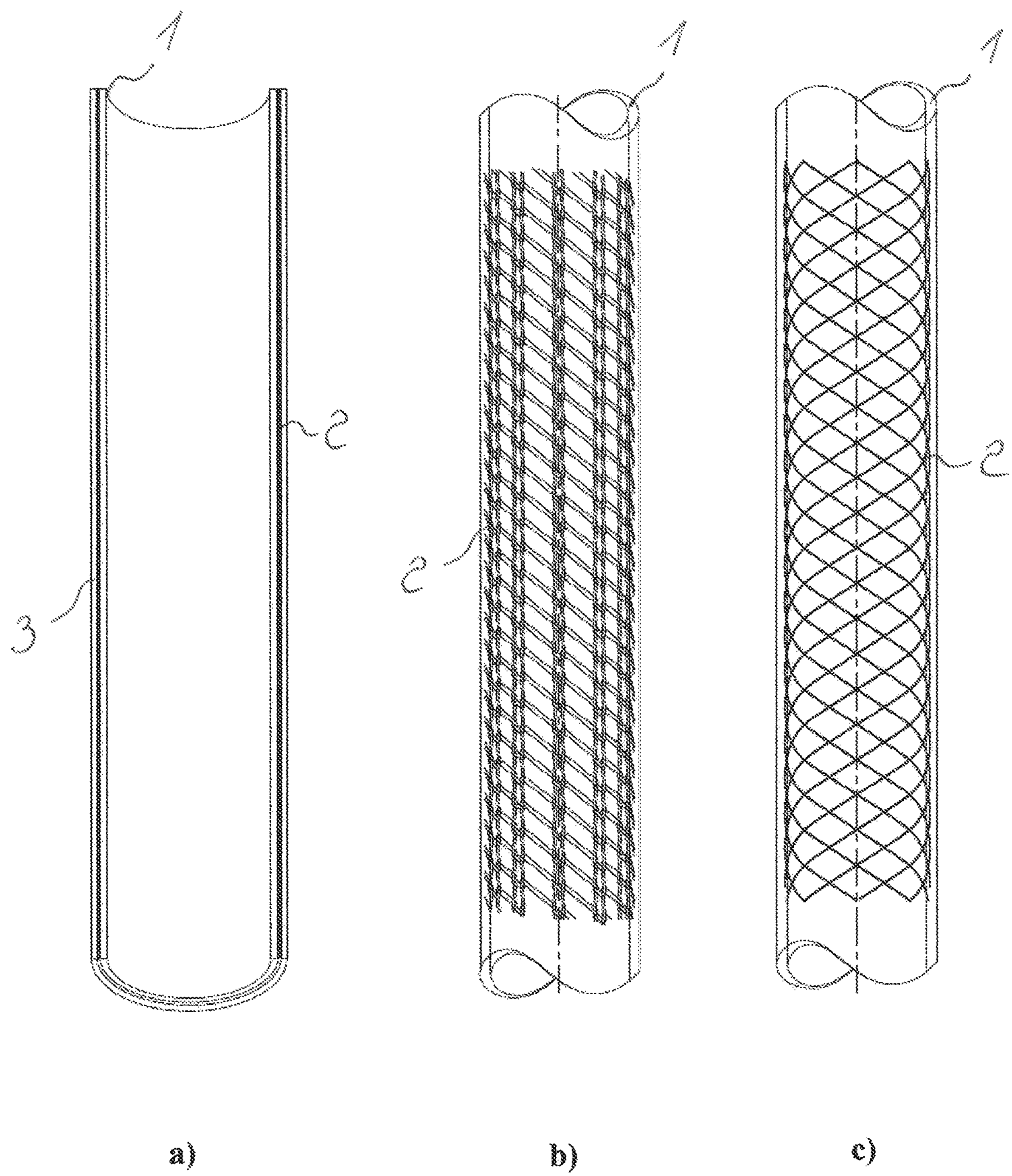

FIG. 1 shows a first part of the making-of sequence of embodiment of the hose 10, wherein an extrusion of a first thin layer of a first elastically extensible polymeric material is carried out for realizing a first inner tubular layer 1 (FIG. 1*a*).

Subsequently, according to known methodologies, a textile reinforcement 2 which is suitably made of polymeric material and which can be mashed (FIG. 1*b*) or braided (FIG. 1*c*) will be provided with the purpose of increasing the stability of the hose 10 when pressurized, increasing the burst pressure.

Subsequently, a second thin layer 3 in a second extensible polymeric material may be provided, for example by extrusion, on the reinforcement 2 to stabilize it, obtaining a multilayer single tubular body 4.

The latter will undergo to appropriate procedures, one of which will be described below, in order to take corrugated configuration.

Figure 2:
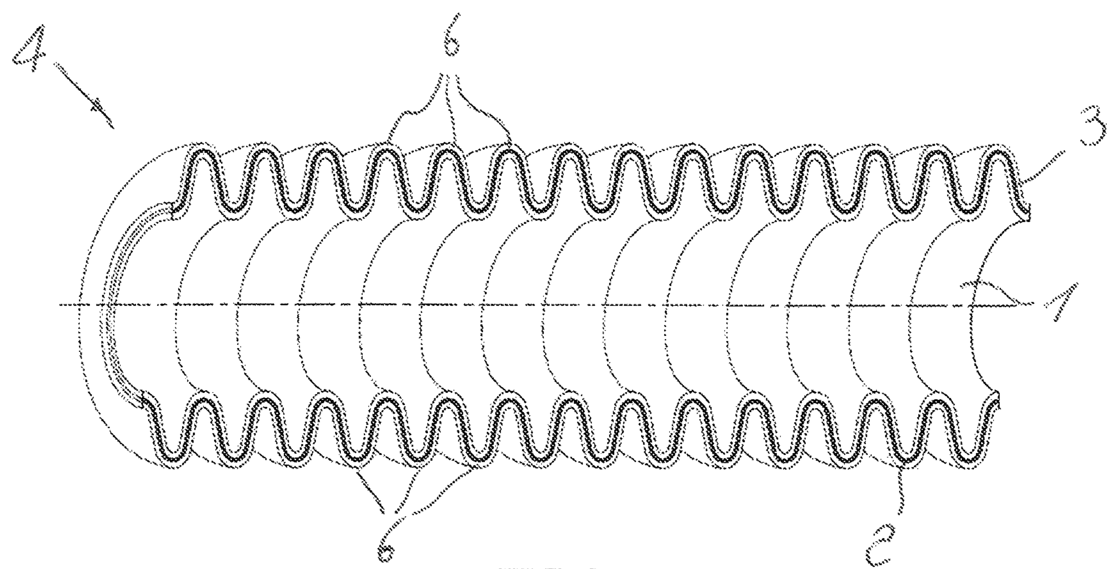
FIG. 2 is a front view of a hose in a further step of the making-of sequence.
Figure 3:
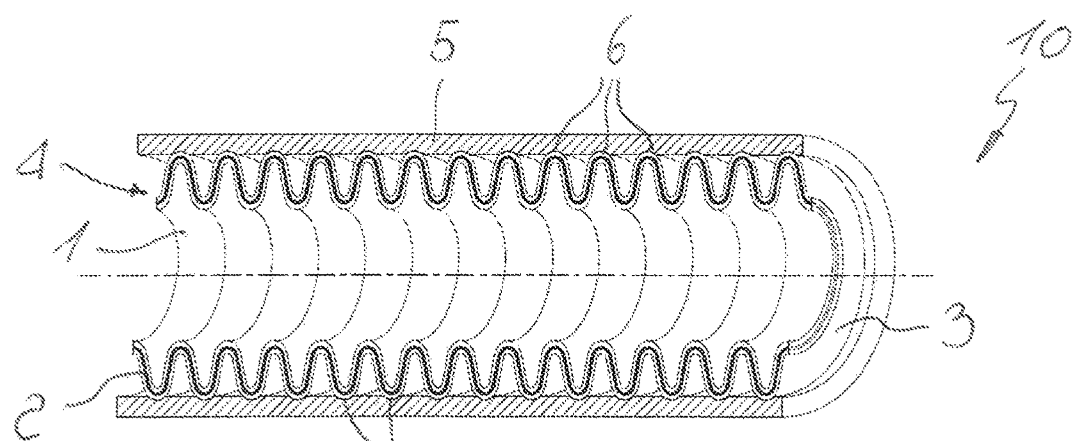
FIG. 3 is a cross sectional view of the hose in resting condition.
Figure 4:
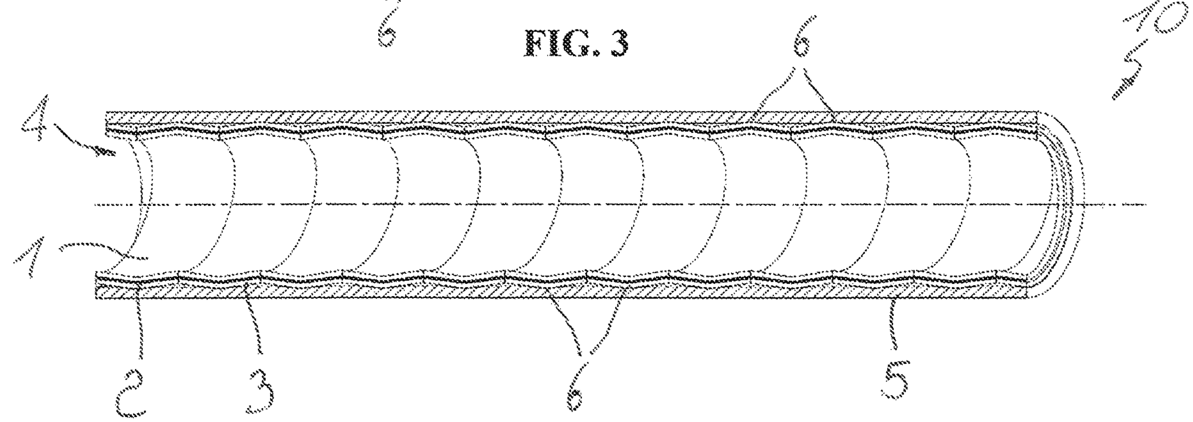
FIG. 4 is a cross sectional view of the hose in elongated condition following the pressurized water flowing thereinside.

For example, the corrugation of the tubular body 4 may optionally comprise the arrangement of a containment element, not shown, which may be a helix-shaped element spiral wound around the stabilization layer 3 or that may also have different shapes, such as annular shape, and which will force the tubular body 4 to expand radially and corrugate, assuming the shape visible in FIG. 2. By varying the corrugation degree, it is possible to modify the maximum elongation of the hose 10.

Finally, on top of the corrugated tubular body 4, a tubular coating third layer 5 made of very soft and elastic plastic material will be applied and anchored to the corrugation ridges 6.

The coating layer 5 will have a thickness greater than that of the previous layers to favor elastic return of the hose 10 but avoiding that such third layer 5 may corrugate itself and create dirt collection areas.

The elastic return may be increased by inserting elastic threads on the outer surface of the corrugation.

The outer coating third layer 5 will be suitably very elastic and soft so as to allow the hose 10 to return to the normal size after use.

The whole process, including the corrugation steps, will preferably but not exclusively be carried out in line.

Therefore, regardless of the particular process used, in its most essential form, the hose 10 will comprise from the inside to the outside:

- a first layer 1 in an elastically extendable first polymeric material;
- a mashed or brided reinforcement 2 wound on the first inner layer 1;
- a stabilizing second layer 3 in an elastically extendable second polymeric material covering the reinforcement 2;

wherein the three layers 1, 2, 3 undergo a corrugation step to obtain an elastic and corrugated tubular body 4;

- a coating third layer 5 covering the corrugated tubular body 4.

The selection of materials for the several layers is not limitative for the present invention, within the limit of the elasticity features required to favor the corrugation of layers 1 and 3 and to avoid corrugation of the third layer 5.

By way of a non-limiting example, the first and second polymeric materials may be selected from the group comprising elastomers and thermoplastic elastomers (TPE). In particular, TPE-S can be used, such as PP/SEBS, PP/EPDM or TPE-0, such as ethylene-octene copolymer. Additional suitable elastomeric materials may be rubber or latex.

The tubular body 4 may have a overall Shore A hardness measured according to ASTM 02240 (3") standard between 30 ShA and 80 ShA and preferably between 40 ShA and 60 ShA.

For example, the reinforcement 2 may be selected between multifilament materials made of polyester, nylon, PE, PP, PVA, aramidic, para-aramidic, meta-aramid fibers, Rayon®.

Figure 5:
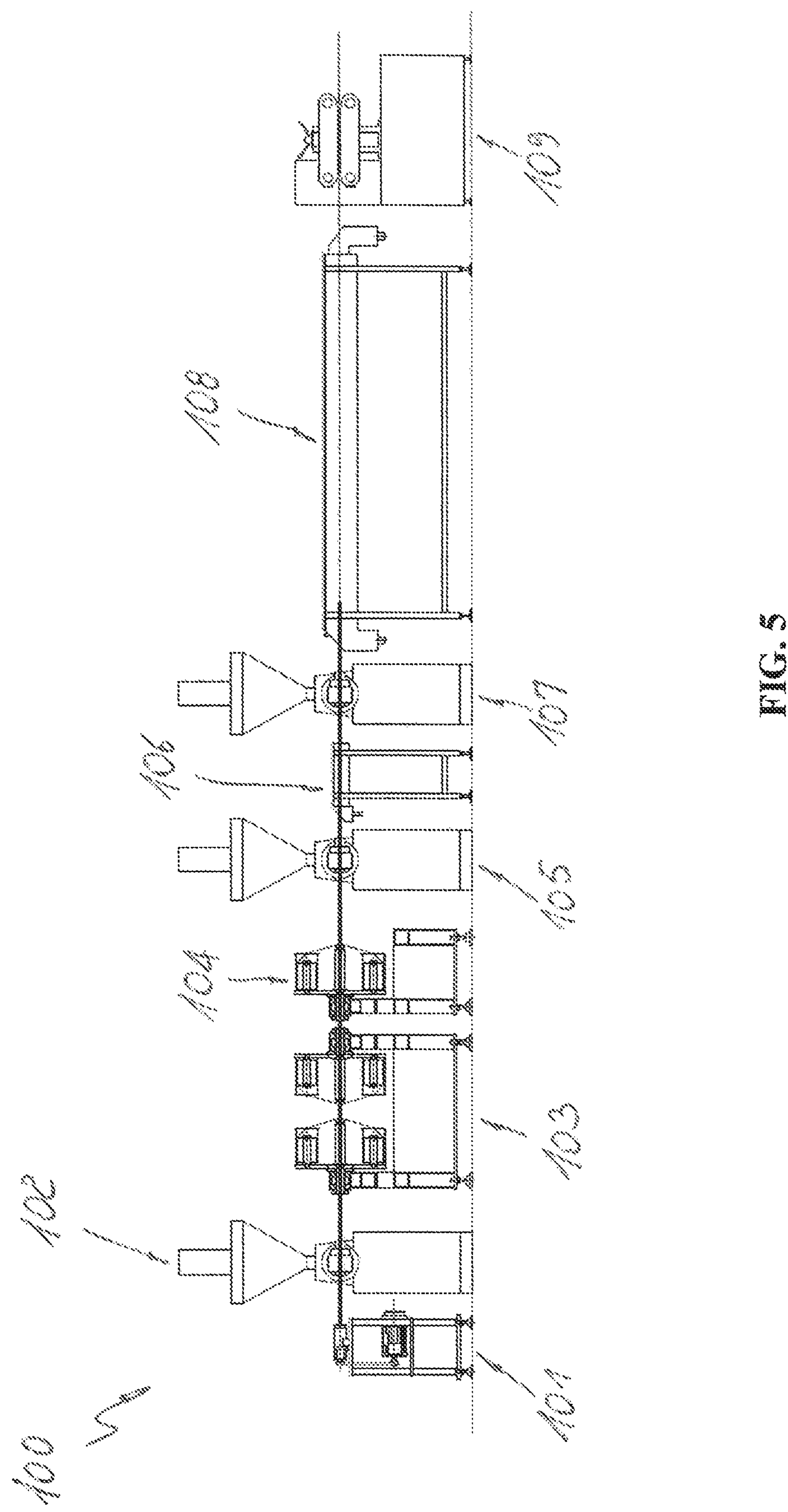
FIG. 5 is a side view of the line for realizing the hose according to the invention.

FIG. 5 shows a preferred, but not exclusive, embodiment of a system for manufacturing a hose according to the method of the invention.

The system, generally designated with 100, comprises, as a first station, a spindle 101 supporting the extruded first tubular layer 1 and forwarding it, with a translational movement having same direction of the axis of the spindle 101 and a possible rotational movement around the axis of the spindle 101.

A first extruder 102 for the first tubular layer 1, having a known structure and therefore not described in more detail, is provided downstream of the spindle 101, whose task will obviously be to deposit the first polymeric material on the spindle 101 so as to form the inner first layer 1.

There is thus provided a first double spiraling machine 103 suitable to reinforce the first layer 1 with one or two sets of threads and making the above reinforcement 2.

In an exemplary but not limitative manner, the first spiraling machine 103 may be composed of two rotating bodies with support for two sets of yarns. These rotating bodies may rotate at speeds different with each other and deposit on the first layer 1 of the profile the reinforcement 2 taken from the yarns.

Downstream of the first spiraling machine 103 there is provided a second spiraling machine 104 with a single set of threads used to set the pitch of the helical corrugation of the first layer 1 according to the method described below.

The second spiraling machine 104 may comprise a single set of yarn spools and a rotating body that rotates at a suitable speed so as to deposit one or more close yarns that will oblige the first tubular layer 1 to corrugate, creating near the yarn deposition, the portion of the corrugated hose closest to the forwarding axis.

Downstream of the second spiraling machine 104 there is provided a second extruder 105 for securing the reinforcement 2 on the first inner hose layer 1 by adding the second tubular layer 3 made of elastically extensible polymeric material which will adhere to the first layer 1 and englobe the textile reinforcement 2.

A first cooling vessel 106 will be placed immediately downstream of the second extruder 105 to cool the reinforced first layer 1 by a light jet of cold water and allow the spindle 101 to promote the corrugation.

At this point, the third coating layer 5 will be applied to the corrugated single tubular body 4 by means of a third extruder 107.

Suitably, the single tubular body 4 will have to corrugate shortly before entering the extrusion head of the third extruder 107.

The third extruder 107 will deposit on the ridges 6 of the corrugated body 4 a third elastic tubular layer 5, the function of which will be to protect the corrugated body 4, to allow it to hold the compacted shape in absence of fluid pressure thereinside and to smooth the outer surface of the extensible hose 10.

A second cooling vessel 108 will have the function of cooling the hose 10 before it is pulled out of the towing 109 and deposited out of the extrusion line 10.

The line 10 may be completed with a cutter, not shown, to cut the hose into pieces of predetermined length or a winder, even not shown, if it would be preferable to cut the hose 10 at a later stage.

Figure 6:
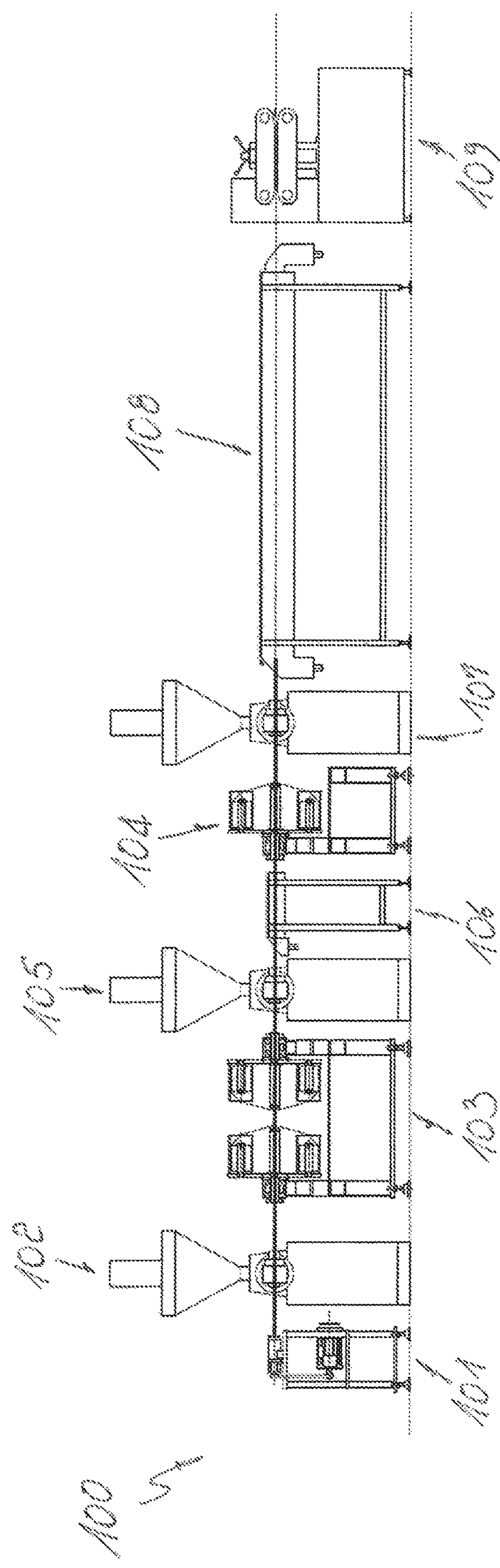
FIG. 6 is a side view of a variant of the line of FIG. 5.

The embodiment of FIG. 6 differs from the previous one because the second spiraling machine 104 is located downstream of the first cooling vessel 106.

The spindle 101 will have the function of making the corrugated hose 4 by deposition of the first layer 1, of the reinforcement 2 and of the stabilizing second layer 3.

Subsequently, by means of the second spiralizing machine 104, a non-elastic thread-like plastic coil is deposited, which will oblige a portion of the outer surface of the first layer 1 to remain adherent to the spindle 101.

The plastic coil may be in the same material used for reinforcement 3, but monofilaments or other plastic materials may also be used, and even more rigid materials, such as wire of metal materials, may be used.

In addition, the spiral may or may not be embedded within the corrugated tubular body.

In this way, by varying the speed and/or the advancement pitch of the first inner layer 1 the latter will be forced to corrugate as it will not be able to expand radially.

Figure 7:
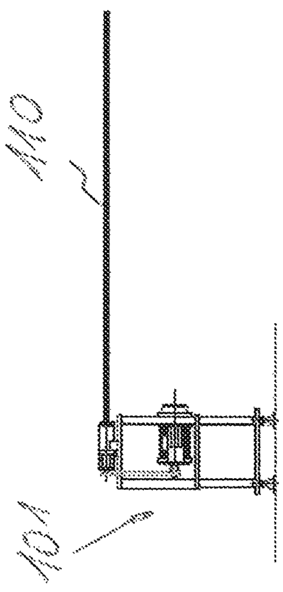
FIG. 7 is a side view of a detail of the line of FIGS. 5 and 6.

According to an operating mode, the spindle 101 will be provided with a supporting shaft 110, shown in FIG. 7, extending for the entire longitudinal development of the line 10 and which will cause the advancing of the inner layer 1.

Such shaft 110 will be suitably shaped externally, in known ways, so as to impart a different pitch between its section upstream of the second spiralizing machine 104 and the section downstream of the latter, with this second pitch lower than the pitch provided upstream so that the first polymeric material of the first layer 1 will be forced to advance with reduced feed.

Therefore, accumulation of material will result in the portion immediately upstream of the area of the shaft 110 wherein the change of pitch occurs, that, however, could not produce a uniform radial expansion of the first layer 1 due to the presence of the non-elastic spiral applied from the second spiraling machine 104.

Consequently, the first layer 1 will radially expand only at areas where it is not in contact with the plastic spiral, producing corrugation.

Figure 8:
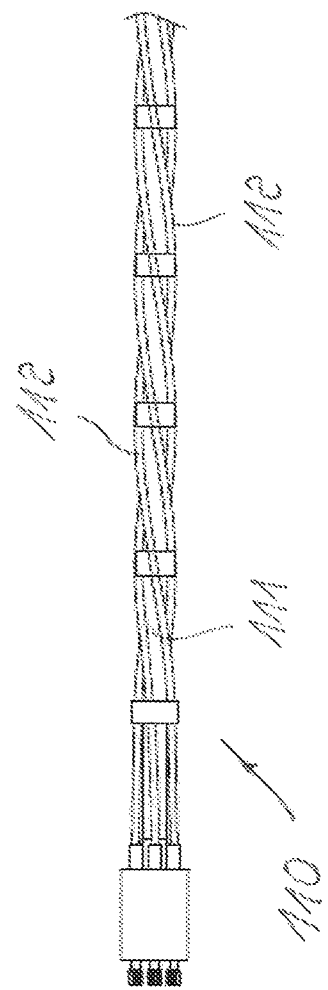
FIG. 8 is a front view of a detail of the spindle of a system for manufacturing a hose according to the method of the invention.

FIG. 8 shows a further detail of the spindle 101 according to a preferred embodiment, wherein it could be noted that the support shaft 110 comprises a central tubular element 111 and peripheral flexible shafts 112 wound around the central element 111 with a helical path having variable pitch at the passage between the said section of the second spiraling machine 104 and the downstream section of the latter.

The hose and the relative manufacturing method according to the invention are subject to numerous modifications and variations, all of which fall within the inventive concept expressed in the appended claims. All details may be replaced by other technically equivalent elements, and the materials may be different according to the needs without departing from the scope of the present invention.

The invention claimed is:

1. An extensible corrugated hose, comprising:
- a first bearing layer (1) in a elastically extensible first polymeric material;
- a reinforcement (2) wound on said first layer (1);
- a stabilizing second layer (3) in an elastically extensible second polymeric material covering said reinforcement (2) for defining a single tubular body (4) with said first layer (1);
- wherein said single tubular body (4) is corrugated, a coating third layer (5) being further provided and placed on said second layer (3) for covering said corrugated single tubular body (4).

2. Hose as claimed in claim 1, wherein said reinforcement (2) is meshed, braided or spiral wound.

3. Hose as claimed in claim 2, wherein said reinforcement (2) is formed by a single or double first yarn series.

4. Hose as claimed in claim 3, wherein said corrugated single tubular body (4) has a plurality of ridges (6), said third coating layer (5) being firmly connected with said ridges (6).

5. Hose as claimed in claim 4, wherein said third coating layer (5) has a thickness greater than said corrugated tubular body (4) so as to not undergo corrugation following the expansion and contraction thereof.

6. A method for manufacturing an extensible corrugated hose (10) comprising the following steps:
- a) making a first layer (1) in an elastically extensible first polymeric material;
- b) positioning of a reinforcement (2) on said inner layer (1);
- c) positioning of a stabilizing second layer (3) in an elastically extensible second polymeric material to cover said reinforcement (2) and defining a single tubular body (4) with said first layer (1);
- d) applying a third coating layer (5) above said second layer (3) to cover said single body (4);
- the method further comprising a corrugation step e) of said single tubular body (4).

7. Method as claimed in claim 6, wherein said corrugation step (e) is carried out immediately upstream of said step d) of application of said third layer (5).

8. Method as claimed in claim 6, wherein said corrugation step e) comprises a step e') of application of a non-elastic thread-like plastic coil having predetermined pitch on said first inner layer (1).

9. Method as claimed in claim 6, wherein said step a) of realizing said first layer (1) comprises a step a') of extrusion of said first polymeric material close to the head of an advancing spindle (101) and a step a") of forwarding said first layer (1) with translational or rototranslational motions having predetermined speed and pitch, said forwarding being promoted by said spindle (101).

10. Method as claimed in claim 9, wherein said corrugation step e) provides that said first layer (1) advance longitudinally with a first pitch for a first longitudinal section thereof and with a second pitch lower than the first for a second longitudinal section downstream of the first section to cause radial expansion of said first section, said first section being locally bound in a radial direction by means of a non-elastic element for generating said corrugation ridges (6).

11. Method as claimed in claim 10, wherein said corrugation step e) comprises a cooling step f) of at least said first layer (1).

12. Method as claimed in claim 11, wherein said cooling step f) is carried out downstream of said step e) of application of said plastic thread-like coil.

* * * * *